Sept. 16, 1930.   C. P. EISENHAUER   1,776,113
PUMP
Filed Nov. 3, 1926
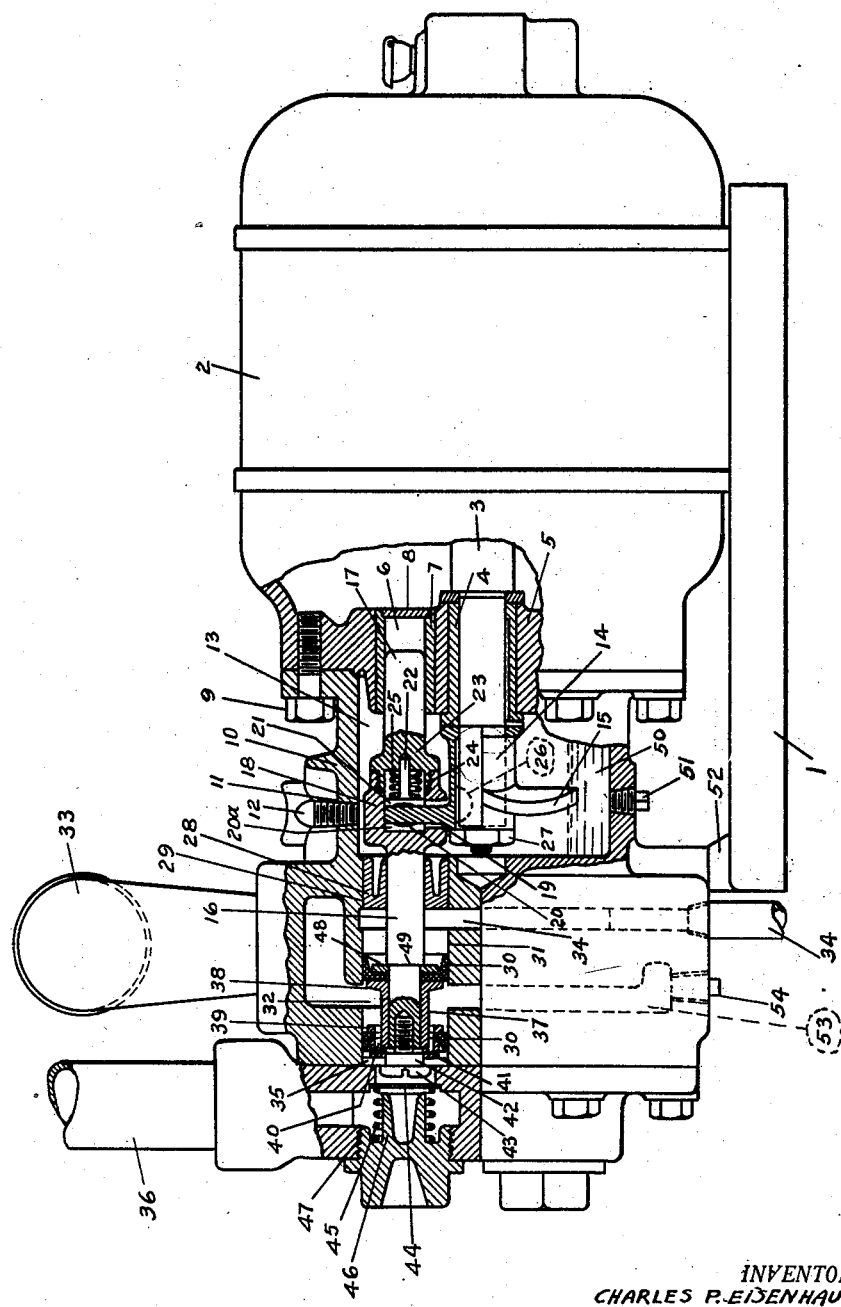
INVENTOR.
CHARLES P. EISENHAUER.
BY
ATTORNEYS.

Patented Sept. 16, 1930

1,776,113

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

PUMP

Original application filed February 25, 1926, Serial No. 90,636. Divided and this application filed November 3, 1926. Serial No. 146,037.

My invention relates to pumps and is a division of my application Serial No. 90,636.

It is the object of my invention to provide a pump which can be directly connected to the driving element, such as an electric motor.

Referring to the drawing:

The figure is a side elevation of the pump and driving mechanism partially in section.

Referring to the drawing in detail, 1 is a common base for the entire mechanism, the motor 2 being supported thereon having an armature shaft 3. This armature shaft is journaled in the bearing 4 in the end of the motor housing or cage 5, in which housing there are a plurality of apertures 6 around the armature shaft line with bushings 7, sealed from the interior of the motor by the plates 8.

To this end of the cage of the motor there is bolted by the bolts 9 the pump housing 10. Access to the interior of this housing for lubrication purposes may be had through the aperture 11 closed by the oil filling plug 12. Within one part of this housing 10 is an actuating mechanism chamber 13.

The armature shaft 3 has mounted on the outer end thereof a cam sleeve 14 carrying a cam 15 which transverses the major axis of the piston rods 16 and piston rod guides 17, the guides reciprocating in the apertures 6 within the bearing sleeves 7.

The piston rod on its inner end is provided with a sleeve 18 having a slot cut in one side as at 19 through which the cam 15 rotates and in doing so engages within the chamber 20 inside of the head 18 with a piston rod 21 with a spring pressed piston having a plunger rod 22 which is guided in the forward end 23 of the piston rod guide, which is threaded within the head at 24 forming a cup within which seats the spring 25 which engages the under side of the piston 21, thus insuring a constant yielding engagement of the piston rod 16 and its associated parts with the actuating cam 15. 20ª is a bearing plate in the chamber 20 engaging the other side of the cam.

It will be noted that the sleeve 14 is connected to the armature shaft 3 by a key 26 and a nut 27 on the end of the shaft. Thus, the cam is detachable for replacement and repair. The piston rod 16 is guided in its reciprocatory movement by the sleeve 28 mounted within the tubular passageway 29 which is the main cylinder for the piston on the piston rod 16. This piston consists of a pair of spaced washers 30, cup-shaped in section with their cups oppositely disposed, the rear cup engaging with the walls 31 of the cylinder, which are bounded on either side by the inlet passageway 32 of the suction line 33 and the drain line 34. The forward cup engages with the walls of the cylinder which are bounded on one side by the inlet suction line 32 and on the other side by the outlet chamber 35 leading to the outlet or discharge line 36.

These cup-shaped washers are spaced from one another by the sleeve 37 having the platelike shoulders 38 and 39, the latter being provided with passageways 40 which are closed in one direction by the valve plate 41 which is loosely mounted on the screw 42 and retained in position by the head 43 thereof.

The head of this screw projects in an exit passageway 35, the mouth of which is sealed by a discharge valve plate 44 held in position normally by a spring 45 carried on a sleeve 46 threaded at 47 within the discharge line.

The rear washer 30 is embraced between the plate 38 and the plate 48 which plate 48 engages a shoulder 49 on the piston rod 16.

The chamber 13 at its lower side carries lubricant 50 above the drain plug 51. The pump casing is supported by the bracket 52 on the common base 1. A suction drain line 53 is provided which can be drained by the plug 54 at the bottom of the pump casing.

Method of operation

As the electric motor rotates its armature shaft, the cam 15 will rotate and in doing so will reciprocate the respective piston rods and pistons in succession. In doing so, as it drives the piston to the left hand, the fluid behind the piston will pass through the openings 40 as the pressure of the fluid will lift the valve plate 41. When the piston starts to return, the pressure of the confined fluid will seat the valve plate 41 and lift the valve plate 44 against the spring 45 discharging the fluid into the discharge line.

The apparatus is self lubricated and takes up the wear due to its spring pressed engaging parts.

It will be understood that I desire to comprehend within my invention such modifications as may be necessary to adapt it to varying conditions and uses.

Having thus fully described my invention, what I claim as new and desire to secure by Letters Patent, is:

In a piston rod, a rod carrying a piston at one end and a chambered portion at the other, having a lateral slot, a guide rod engaged in the rear end of the chambered portion and bearing members carried in said chambered portion spaced from one another engaging the sides of an actuating cam projected through said slot and into said chambered portion, one of said bearing members having a guide rod adapted to reciprocate in the first mentioned guide rod and guided thereby, and yielding means for maintaining said member in engagement with said cam.

In testimony whereof, I affix my signature.

C. P. EISENHAUER.